US009345299B2

(12) United States Patent
Lee et al.

(10) Patent No.: US 9,345,299 B2
(45) Date of Patent: May 24, 2016

(54) PORTABLE ELECTRONIC DEVICE EQUIPPED WITH PROTECTIVE COVER AND DRIVING METHOD THEREOF

(71) Applicant: Samsung Electronics Co., Ltd., Suwon-si, Gyeonggi-do (KR)

(72) Inventors: Jun-Hui Lee, Gumi-si (KR); Chul-Woo Jin, Busan (KR); Gwang-Hui Lee, Gumi-si (KR); In-Kyu Choi, Chilgok-gun (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 14/253,124

(22) Filed: Apr. 15, 2014

(65) Prior Publication Data

US 2014/0318994 A1  Oct. 30, 2014

(30) Foreign Application Priority Data

Apr. 24, 2013 (KR) .................. 10-2013-0045271

(51) Int. Cl.
| | |
|---|---|
| A45C 11/00 | (2006.01) |
| G01B 11/14 | (2006.01) |
| H04M 1/02 | (2006.01) |
| H04M 1/18 | (2006.01) |

(52) U.S. Cl.
CPC ............ *A45C 11/00* (2013.01); *H04M 1/0214* (2013.01); *A45C 2011/002* (2013.01); *A45C 2011/003* (2013.01); *G01B 11/14* (2013.01); *H04M 1/0245* (2013.01); *H04M 1/185* (2013.01); *H04M 2250/12* (2013.01); *H04M 2250/22* (2013.01)

(58) Field of Classification Search
USPC .................... 356/213; 715/744, 761; 710/62; 345/173, 156; 250/221
See application file for complete search history.

(56) References Cited

U.S. PATENT DOCUMENTS

| | | | | |
|---|---|---|---|---|
| 5,519,483 A | * | 5/1996 | Kawanishi ........... | G03G 15/607 355/75 |
| 8,143,983 B1 | * | 3/2012 | Lauder ................ | G06F 1/1626 24/303 |
| 2007/0291015 A1 | * | 12/2007 | Mori .................... | G06F 1/1626 345/173 |
| 2008/0074400 A1 | * | 3/2008 | Gettemy .............. | G06F 1/1622 345/173 |
| 2008/0227505 A1 | | 9/2008 | Jang et al. | |
| 2010/0273530 A1 | * | 10/2010 | Jarvis ................... | F16F 1/027 455/566 |
| 2010/0321289 A1 | | 12/2010 | Kim et al. | |
| 2012/0129580 A1 | * | 5/2012 | Tam ..................... | G01S 7/4813 455/575.1 |
| 2012/0132790 A1 | | 5/2012 | Huang et al. | |
| 2013/0075595 A1 | * | 3/2013 | Ruh .................... | G01S 7/4814 250/221 |
| 2013/0215007 A1 | * | 8/2013 | Hung .................. | G06F 1/1677 345/156 |
| 2013/0300679 A1 | * | 11/2013 | Oh ...................... | A45C 11/00 345/173 |
| 2014/0282059 A1 | * | 9/2014 | Oh ...................... | G06F 3/0484 715/744 |

FOREIGN PATENT DOCUMENTS

| | | |
|---|---|---|
| KR | 10-2008-0083894 A | 9/2008 |
| KR | 10-2010-0136649 A | 12/2010 |

* cited by examiner

*Primary Examiner* — Sang Nguyen
(74) *Attorney, Agent, or Firm* — Jefferson IP Law, LLP (57) ABSTRACT

A portable electronic device equipped with a protective cover is provided. The portable electronic device includes a protective cover that is equipped with a reflector having a light reflection characteristic, a proximity sensor that is equipped with a light emitting unit and a light receiving unit, and that is configured to generate a sensing signal based on an amount of light that the light receiving unit receives in response to light emitted from the light emitting unit, and a controller that is provided with the sensing signal generated from the proximity sensor and that is configured to determine whether the protective cover is open or closed.

13 Claims, 6 Drawing Sheets

FIG.6B

# PORTABLE ELECTRONIC DEVICE EQUIPPED WITH PROTECTIVE COVER AND DRIVING METHOD THEREOF

CROSS-REFERENCE TO RELATED APPLICATION(S)

This application claims the benefit under 35 U.S.C. §119(a) of a Korean patent application filed on Apr. 24, 2013 in the Korean Intellectual Property Office and assigned Serial No. 10-2013-0045271, the entire contents of which are hereby incorporated by reference.

TECHNICAL FIELD

The present disclosure relates to a portable electronic device. More particularly, the present disclosure relates to a portable electronic device equipped with a detachable protective cover and a driving method thereof.

BACKGROUND

Recently, portable electronic devices, such as a smart phone, a cellular phone, a Portable Multimedia Player (PMP), a digital audio player, a tablet Personal Computer (PC), a notebook, a personal navigation device, a portable game console, and the like, have increased sizes of their display units to execute various multimedia functions. Also, the portable electronic device has included therewith an input device (that is, a touch screen) that enables a user to input a screen touch input in cooperation with a display unit, so as to provide a user interface.

There is a probability that an outer case, or particularly, a display unit of the portable electronic device which is installed in a front side is damaged by a scratch or impact while the portable electronic device is carried or is utilized and thus, a protective cover (hereinafter, 'protective cover' or 'cover') to prevent the damage is provided. An example of technology associated with the protective cover of the portable electronic device is provided in Korean Patent Publication No. 10-2008-0083894 by Hwan Gee JANG et al., which published on Sep. 19, 2008 and has the title "*Apparatus for controlling operation in a wireless terminal with removable outer case.*"

As described above, the portable electronic device equipped with the protective cover may include an apparatus and a function for determining whether the protective cover is in an open state or a closed (e.g., covered) state. Through the above, for example, when the protective cover is in a closed state, a display panel may be deactivated, or the corresponding portable electronic device may be locked/unlocked based on whether the protective cover is open or closed. As a configuration for determining whether the protective cover is open or closed, for example, a configuration in which a magnetic component is contained in an appropriate portion of the protective cover and a hall sensor included in a corresponding portable electronic device may be employed, as disclosed in Korean Patent Publication No. 10-2008-0083894.

However, when a hall sensor is used as described above, the cost of materials for applying the hall sensor may increase and securing space for receiving the hall sensor may be difficult. Due to the magnetic component of the protective cover, a magnetic card (for example, a credit card and the like) carried by a user of the electronic device may be damaged or another device that is carried by the user may malfunction.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a protective cover of which manufacturing costs are reduced and for which space is readily secured, a portable electronic device equipped with the protective cover, and a driving method thereof.

Another aspect of the present disclosure is to provide a protective cover that effectively senses whether a protective cover is open or closed, and a portable electronic device equipped with the protective cover, and a driving method thereof.

Another aspect of the present disclosure is to provide a protective cover that may be stably carried by a user, a portable electronic device equipped with the protective cover, and a driving method thereof.

In accordance with another aspect of the present disclosure, a portable electronic device equipped with a protective cover is provided. The portable electronic device includes a protective cover that is equipped with a reflector having a light reflection characteristic, a proximity sensor that is equipped with a light emitting unit and a light receiving unit, and that is configured to generate a sensing signal based on an amount of light that the light receiving unit receives in response to light emitted from the light emitting unit, and a controller that is provided with the sensing signal generated from the proximity sensor and that is configured to determine whether the protective cover is open or closed.

The proximity sensor is configured to be driven in an operation mode of one selected from a first driving current level and a second driving current level that is lower than the first driving current level, and the controller configured to determine that the protective cover is closed when the sensing signal is output while the proximity sensor is driven at the second driving current level.

In accordance with another aspect of the present disclosure, a method of driving a portable electronic device equipped with a protective cover is provided. The method includes driving, at a predetermined low current level, a proximity sensor that generates a sensing signal corresponding to a proximity of an object based on an amount of light that a light receiving unit absorbs after being generated from a light emitting unit and being reflected by an object, and determining that the protective cover is closed when the sensing signal is output from the proximity sensor while the proximity sensor is driven at the low current level.

In accordance with another aspect of the present disclosure, a protective cover of a portable electronic device is provided. The protective cover includes a front side cover unit and a back side cover unit, which cover a front side and a back side of the portable electronic device, respectively, a connecting unit that is included between the front side cover unit and the back side cover unit, and connects the front side cover unit and the back side cover unit, and a reflector being included in the front side cover unit and having a light reflection characteristic.

As described above, a method of sensing whether a flip protective cover of a portable electronic device is open or closed may reduce manufacturing costs, may readily secure space for a sensor, may be stable for carrying the portable electronic device, and may effectively sense whether the protective cover is open or closed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
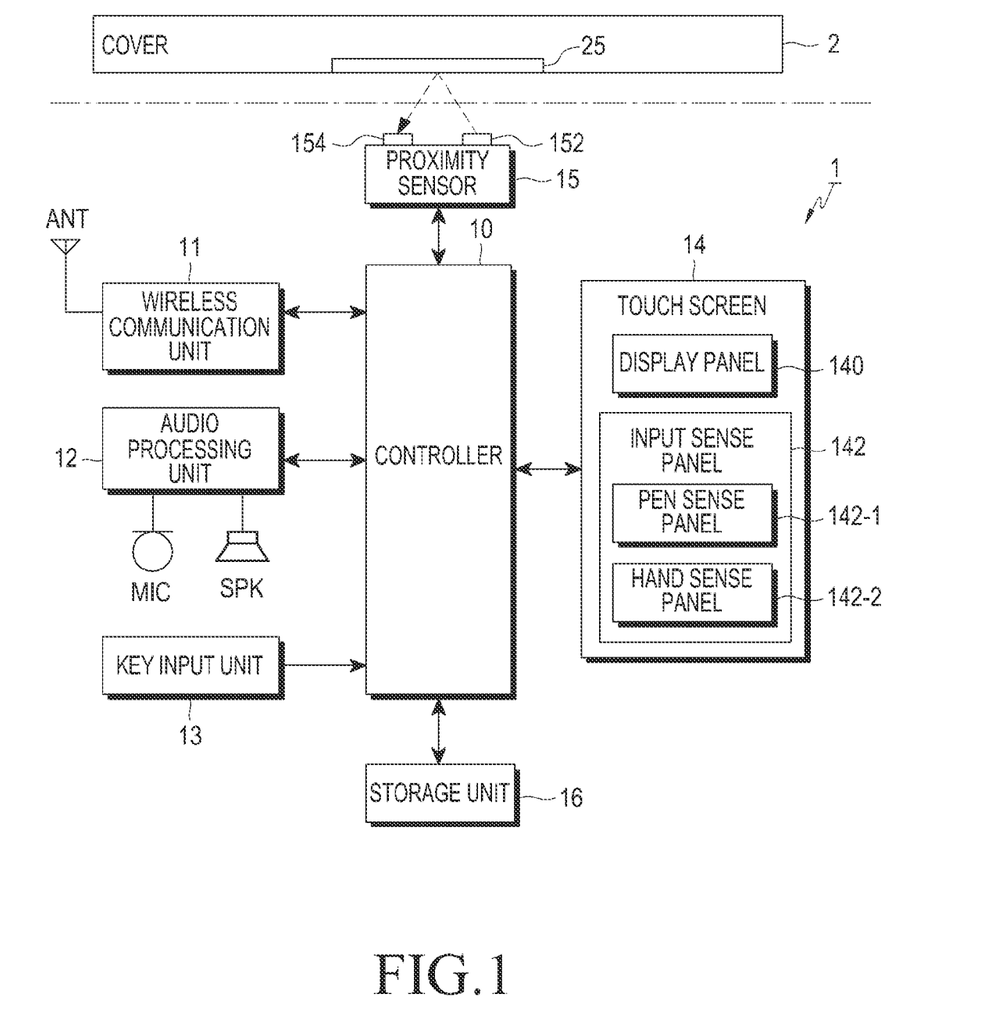
FIG. 1 is an overall block diagram illustrating a portable electronic device equipped with a flip protective cover according to an embodiment of the present disclosure.
Figure 2A:
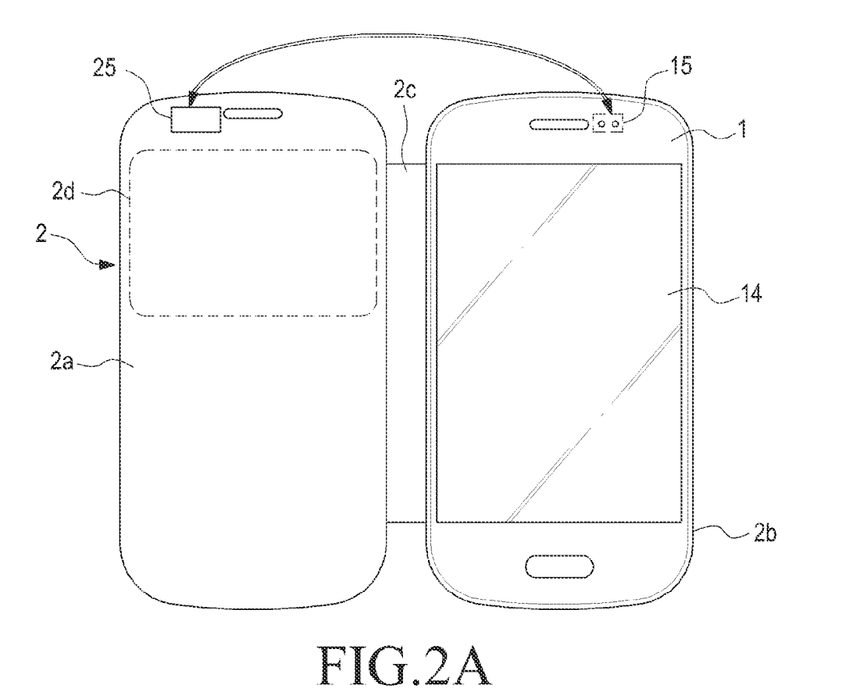
FIGS. 2A and 2B are front views of a portable electronic device equipped with the flip protective cover of FIG. 1 according to an embodiment of the present disclosure.
Figure 2B:
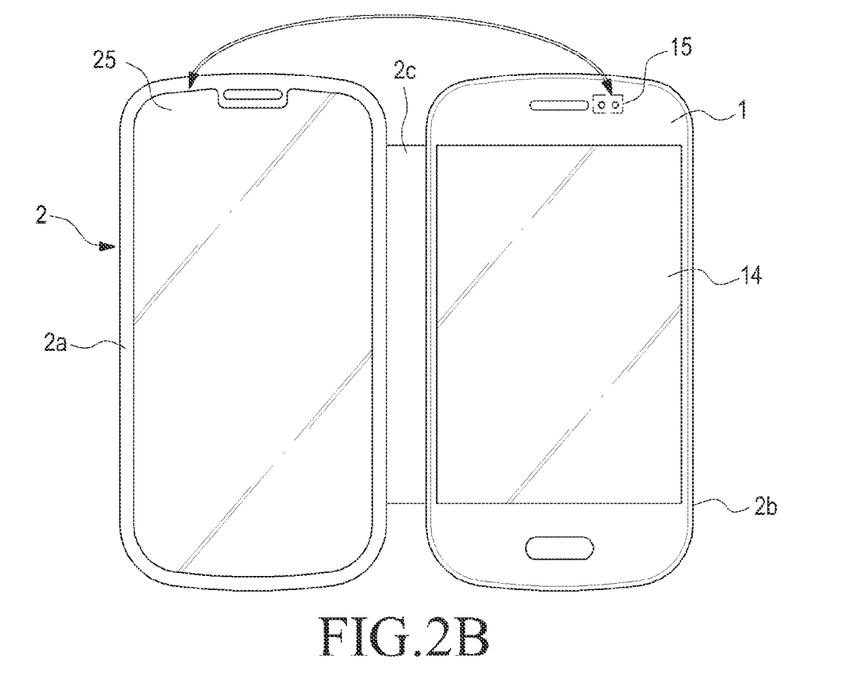

FIG. 1 is an overall block diagram illustrating a portable electronic device equipped with a flip protective cover according to an embodiment of the present disclosure, and FIGS. 2A and 2B are front views of the portable electronic device equipped with the flip protective cover of FIG. 1 according to an embodiment of the present disclosure, which show that the flip protective cover is unfolded (i.e., open). Examples of FIG. 1 and FIGS. 2A and 2B illustrate a case in which a portable electronic device 1 according to an embodiment of the present disclosure is a mobile communication terminal.

Referring to FIGS. 1, 2A, and 2B, the portable electronic device 1 according to an embodiment of the present disclosure may be configured to include a controller 10, a wireless communication unit 11, an audio processing unit 12, a key input unit 13, a touch screen 14, a proximity sensor 15, and a storage unit 16.

The touch screen 14 is configured to include a display panel 140 that displays information output from the portable electronic device 1 and an input sense panel 142 that performs various input functions by a user. In this example, the display unit 140 may be embodied as a Liquid Crystal Display (LCD) or an Organic Light Emitting Diodes (OLED) screen such as a Passive-Matrix OLED (PMOLED) or an Active-Matrix OLED (AMOLED), and may be embodied as a unit that is structurally integrated with the input sense panel 142. The display panel 140 may display various screens associated with various operation states of the corresponding portable electronic device 1, a menu state, execution of an application and a service, and the like.

The input sense panel 142 is embodied by at least one panel that may sense a variety of inputs such as a single or multi-touch input, a drag input, a write input, a drawing input, and the like provided by a user using various objects such as a finger, an electric pen (for example, a stylus pen, a digitizer pen) and the like. For example, the input sense panel 142 may be embodied using a single panel that is capable of sensing both a finger input and an electronic pen input, or may be embodied using two panels such as a hand sense panel 142-2 that is capable of sensing a finger input and a pen sense panel 142-1 that is capable of sensing an electric pen input.

The hand sense panel 142-2 may be embodied as, for example, a capacitive touch panel, and may sense a touch input by a user, and outputs a touch event value corresponding to the sensed touch signal. In this example, information corresponding to the sensed touch signal may be displayed on the display panel 140. The pen sense panel 142-1 may sense a proximity input or a contact input of the electronic pen while the electronic device is utilized, and may output a sensed electronic pen proximity event or a sensed electronic pen contact event. The pen sense panel 142-1 may be embodied based on an Electro-Magnetic Resonance (EMR) scheme, and a touch input or a proximity input may be sensed based on a change in a strength of an electromagnetic field, which is caused by a proximity or a touch by a pen. The pen sense panel 142-1 may be provided in a lower portion of the display panel 140 with a predetermined area, for example, an area that may cover a display area of the display panel 140.

The wireless communication unit 11 may be included when the corresponding portable electronic device 1 supports a wireless communication function. Particularly, when the portable electronic device 1 supports a mobile communication function, the wireless communication unit 11 may be embodied as a mobile communication module. Particularly, the wireless communication unit 11 may be configured to include an antenna, a Radio Frequency (RF) unit, and a modem, so as to perform transmitting, receiving, and processing of a wireless signal, for the mobile communication function. The RF unit may include an RF transmitter to up-convert and amplify a frequency of a transmitted signal, an RF receiver to low noise amplify and down-convert a received signal, and the like. The modem may include a transmitter to encode and modulate a signal to be transmitted, a receiver to demodulate and decode a signal received in the RF unit, and the like.

A key input unit 13 includes a plurality of keys required for manipulating an operation, and the keys are structurally installed in an exterior of a housing of the corresponding electronic device 1 and the like so as to receive an input for manipulation from a user. The keys may be embodied as a side key, a touch pad that is separately provided, and the like. Also, the key input unit 13 may include a button key for performing turn-on or turn-off of the portable electronic device 1, a home key for returning to a main screen supported by the portable electronic device 1, and the like.

The audio processing unit 12 may include at least one of a speaker to output an audio signal of the portable electronic device 1 and a microphone to collect an audio signal. The audio processing unit 12 may be equipped with a speaker, a microphone, an audio codec that processes an audio signal input or output through the speaker and the microphone, so as to receive a voice of a user or to output an audible sound to a user when a phone call is performed as a mobile communication function, or to output process sounds corresponding to various operations, or output sounds corresponding to various digital audio contents, moving picture contents, and the like.

The proximity sensor 15 is embodied based on a photodiode, and is configured to include a light emitting unit 152 and a light receiving unit 154. The proximity sensor 15 determines proximity information associated with an object based on an amount of light that the light receiving unit 154 absorbs after being generated from the light emitting unit 152 and being reflected by the object (for example, a protective cover). An InfraRed (IR) sensor that senses that an external object approaches at least a predetermined distance within a sense area using IR light may be used as the proximity sensor 15. In this example, the light emitting unit 152 may be embodied as a Light Emitting Diode (LED) that emits IR light, and the light receiving unit 154 may embodied as a detector such as a photo-diode or a photo Transistor (TR) that senses light that is generated from the light emitting unit 152 and is reflected by an object.

According to an embodiment of the present disclosure, the proximity sensor 15 is configured to be driven in an operation mode selected from among operation modes that are driven at a normal current level or at a predetermined low current level under a control of the controller 10. In a case in which light generated from the light emitting unit 152 of the corresponding proximity sensor 15 is reflected by a reflector 25 of the protective cover 2 (for example, at a reflexibility of 70~100%) and is incident into the light receiving unit 154 again, the low current level is set to enable an amount of light that the receiving unit 154 receives to be higher than a predetermined reference value that is set in advance to determine a proximity of an object. In a case in which light generated from the light emitting unit 152 is reflected by another object such as a finger and the like (for example, at a reflexibility of 20~30%) and is incident into the light receiving unit 154, the low current level is set to enable an amount of light that the receiving unit 154 receives to be lower than the predetermined reference value that is set in advance to determine the proximity of the object. In this example, in a case in which light generated from the light emitting unit 152 is reflected by a body part of a user such as a finger or another object and is incident into the light receiving unit 154 as it is normally processed, as opposed to being reflected by the reflector 25, the normal current level is set to enable an amount of light that the light receiving unit 154 receives to be higher than the predetermined reference value for determining the proximity of the object.

The storage unit 16 is configured to store various programs and data used for operating the portable electronic device 1. For example, the storage unit 16 may be configured to include various application programs and related contents and a program memory and a data memory for storing data associated with processing an operation and the like. The program memory stores a program for controlling a general operation of the portable electronic device 1. The storage unit 16 may further store an operation program and a related application program for controlling a driving level of the proximity sensor 15 and determining whether the protective cover 2 is open or closed based on a sensing value of the proximity sensor 15.

The controller 10 generally controls each functional unit so as to control general operations of the portable electronic device 1, and may switch and control an operation of the portable electronic device 1 based on a user input provided through the touch screen 14 or the key input unit 13. Also, according to an embodiment of the present disclosure, the controller 10 may control a driving level of the proximity sensor 15 or may determine whether the protective cover 2 is open or closed based on a sensing value of the proximity sensor 15. In this example, when a sensing signal is output from the proximity sensor 15, the controller 10 determines that the protective cover 2 is closed, and performs a control, for example, so that the portable electronic device 1 enters into a sleep mode. Particularly, when a sensing signal is output while the proximity sensor 15 is driven at a low current level, the controller 10 determines that the protective cover 2 is closed and performs a control so that the portable electronic device 1 enters into the sleep mode. Operations of the controller 10 according to an embodiment of the present disclosure will be described through the following various embodiments of the present disclosure.

The portable electronic device 1 according to an embodiment of the present disclosure may be embodied by including the described components. In addition, the portable electronic device 1 may include a rechargeable battery and the like and each internal functional unit may have a power unit (not illustrated) for providing an operation power. Also, functional units that are applied to a portable electronic device, such as a Global Positioning System (GPS) unit, a motion sensor, a vibration motor, a camera module, and the like may be included or may additionally be included. Also, it is described that the portable electronic device of FIG. 1 has a structure corresponding to a smart phone, a cellular phone, and the like, as an example. However, the portable electronic device according to the present disclosure may be various such as a Portable Multimedia Player (PMP), a Personal Digital Assistant (PDA), a digital audio player, a tablet Personal Computer (PC), a personal navigation device, a portable game console, and the like, and in this example, the wireless communication unit 11 of FIG. 1 and the like may not be included.

As described in FIG. 2A, the flip protective cover 2 includes a front side cover unit 2a that covers a front side of the portable electronic device 1, a back side cover unit 2b that covers a back side of the portable electronic device 1, and a connecting unit 2c that is contained between the front and back side cover units so as to connect those cover units and that enables the front side cover unit 2a to be flipped and opened. In this example, the back side cover unit 2b of the flip protective cover 2 is in a structure in which the back side cover unit 2b is coupled with the back side of the portable electronic device 1 and they are detachable from each other. Also, the flip protective cover may be embodied as an integrated unit with a battery cover. In this example, the back side cover unit 2b may be embodied as a battery cover that is formed to cover a battery pack of the corresponding portable electronic device 1.

In addition, the front side cover unit 2a of the protective cover 2 may include a transparent window 2d that may be formed on a portion corresponding to at least one portion of a region that corresponds to the touch screen 14, so that a user may view a content displayed on the touch screen 14 of the portable electronic device 1 even when it is closed. In a state in which the flip protective cover 2 is installed in the portable electronic device 1, when the flip protective cover 2 is in a closed state, the front side cover unit 2a covers the front side of the touch screen 14 of the portable electronic device 1, and shuts it off from the outside and protects the touch screen 14. Also, when the flip protective cover 2 is in an open state, the front side cover unit 2a is rotated by the connecting unit 2c and may be distant from the touch screen 14 and thus, the touch screen 14 is exposed to the outside.

Also, when the portable electronic device 1 is installed as illustrated in FIG. 2A according to an embodiment of the present disclosure, the front side cover unit 2a of the flip protective over 2 may further include the reflector 25 in a portion that faces a portion where the proximity sensor 15 is installed in the portable electronic device 1. The reflector 25 may be formed of a metallic thin film or pad substantially having a total reflection characteristic with an area corresponding to a size of the proximity sensor 15, or may be formed of a sheet of synthetic resins. When the protective cover 2 is closed (in a direction opposite to a direction indicated by an arrow of FIG. 2A), the reflector 25 reflects light generated from the light emitting unit 152 of the proximity sensor 15 and enables the light to be input into the light receiving unit 154.

FIG. 2B illustrates a modified example of the front side cover unit 2a of the flip protective cover 2 and the reflector 25 according to an embodiment of the present disclosure. As illustrated in FIG. 2B, the reflector 25 may be formed in an overall area of a side that faces the portable electronic device 1 in the front cover unit 2a.

The reflector 25 may be embodied as a metallic thin film or pad of which a surface is processed to have a light reflection characteristic or may be formed of a sheet of synthetic resins, and may be attached on a corresponding portion.

The controller 10 of the portable electronic device 1 may drive the proximity sensor 15 at a predetermined low current level that is set in advance to determine whether the protective cover 2 is open or closed. Also, in a case in which the proximity sensor 15 is driven at the lower current level, when an object proximity sensing signal is output from the proximity sensor 15, the controller 10 may determine that the protective cover 2 is in a closed state. In the case in which the proximity sensor 15 is driven at the low current level, when the protective cover 2 is open, light generated from the light emitting unit 152 may not be reflected by the reflector 25 and thus, an amount of light input into the light receiving unit 154 is less than a reference value for determining a proximity of an object. Therefore, the proximity sensor 15 may not output an object sensing signal. Also, although light reflected by a finger of a user and the like is input into the light receiving unit 154 in a state in which the protective cover 2 is open, the amount of light that the light receiving unit 154 receives is lower than the reference value for determining the proximity of the object and thus, the proximity sensor 15 may not output an object proximity sensing signal.

Also, the proximity sensor 15 according to an embodiment of the present disclosure may change a size of an object proximity sensing signal output from the proximity sensor 15, based on a quality of an object (that is, a reflector). For example, an amount of light emitted may be decreased by changing a driving current of the light emitting unit 152 and thus, an amount of light input into the light receiving unit 154 may be adjusted and a sensing value of the light receiving unit 154 may be adjusted. For example, when a normal driving current adjustment level (e.g., a first driving current level) of the proximity sensor 15 is in a range from 25 mA to 400 mA, a predetermined low current level (e.g., a second driving current level) may be set to be in a range from 5 mA to 400 mA. The first driving current level is used for determining whether a key is unintentionally input by a user when an ear or a cheek of a user is close to or has a contact with a touch screen of the portable electronic device 1 while the user performs a call using the portable electronic device 1. For example, when the light emitting unit 152 is provided as an IR LED, and is driven at a high driving current that is greater than or equal to 200 mA, an amount of light emitted from the IR LED may also be high and the light receiving unit 154 is saturated. Therefore, when a hand of a user or the protective cover 2 is close to the proximity sensor 15, the proximity sensor 15 outputs an object proximity sensing signal greater than or equal to a reference value. In this example, the controller 10 may not be aware of whether the hand of the user or the protective cover 2 is close to the proximity sensor 15. However, the second driving current level according to an embodiment of the present disclosure is for determining whether the protective cover 2 is open or closed, and may be set to be different from the first driving current level. Also, according to an embodiment of the present disclosure, when the protective cover 2 includes the reflector 25 and the protective cover 2 is close to the proximity sensor 15 (is closed), the second driving current level may be changed so that an amount of light received by the light receiving unit 154 is adjusted by the reflector 25 to sense 70~100% of an amount of light emitted from the light emitting unit 152 and outputs the sensing value. When the proximity sensor 15 is covered with a hand, the second driving current level may be changed so that an amount of light received by the light receiving unit 154 is adjusted to sense 20~30% of an amount of light emitted from the light emitting unit 152 and the sensing value is output. For example, the second driving current level is 5 mA, which may be lower than the first driving current level.

Figure 3:
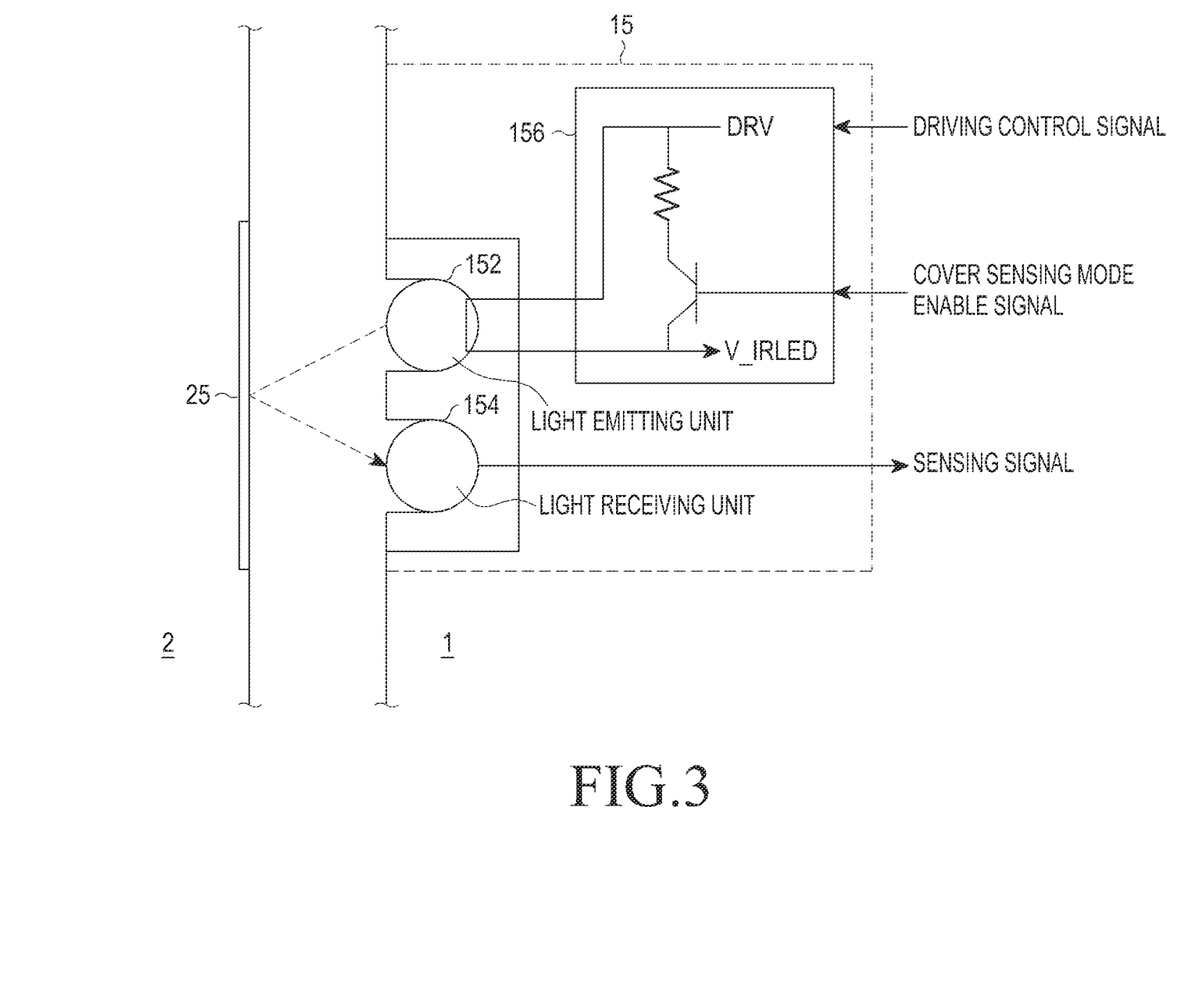
FIG. 3 is a block diagram illustrating a proximity sensor of FIG. 1 according to an embodiment of the present disclosure.

FIG. 3 is a block diagram illustrating the proximity sensor of FIG. 1 according to an embodiment of the present disclosure.

Referring to FIG. 3, the proximity sensor 15 according to an embodiment of the present disclosure may include a driving current adjusting unit 156 for adjusting a driving current level of the light emitting unit 152, in addition to the light emitting unit 152 and the light receiving unit 154. As illustrated in FIG. 3, normally, the driving current adjusting unit 156 provides a driving current, for example, in a range from 25 mA to 400 mA to the light emitting unit 152 based on a driving control signal of the controller 10. In a case of a low current level driving, the driving current adjusting unit 156 may adjust a driving current provided to the light emitting unit 152 based on an output from the controller 10 referred to as a 'cover sensing mode enable signal' according to an embodiment of the present disclosure, so as to provide a driving current of, for example, 5 mA to the light emitting unit 152.

A portable electronic device configured as described above according to an embodiment of the present disclosure may set a sensing mode using the proximity sensor 15 to be different for each of a variety of operation environments, for example, a home screen lock or unlock operation, a multimedia playback operation, a call operation, and the like. For example, an embodiment of the present disclosure may distinctively set a gesture sensing mode, a proximity sensing mode, a cover sensing mode, as the sensing mode of the proximity sensor.

The gesture sensing mode is a mode for sensing a gesture of a user through the proximity sensor 15. In this example, a driving current level of the proximity sensor 15 is set to a normal proximity sense level which is a relatively high level (for example, a range from 200 mA to 400 mA). The proximity sensing mode is a mode for sensing a proximity during a call operation, and a driving current level is set to a high level (for example, a range from 200 mA to 400 mA). The cover sensing mode is a mode for sensing whether a cover is open or closed, and a driving current level is set to a low current level which is a relatively low level (for example, 5 mA).

The gesture sensing mode is a mode for embodying a user interface using the proximity sensor 15. The controller 10 recognizes, for example, a predetermined gesture pattern associated with a hand of a user, which is set in advance, using a sensing signal output from the proximity sensor 15, and performs an operation corresponding to the gesture pattern. An example of a gesture sensing mode technology is provided in Korean Patent Publication No. 10-2010-0136649 by Eun Ji KIM et al., which was published on Dec. 29, 2010 and has the title "*Method for embodying user interface using a proximity sensor in portable terminal and apparatus thereof.*"

Figure 6A:
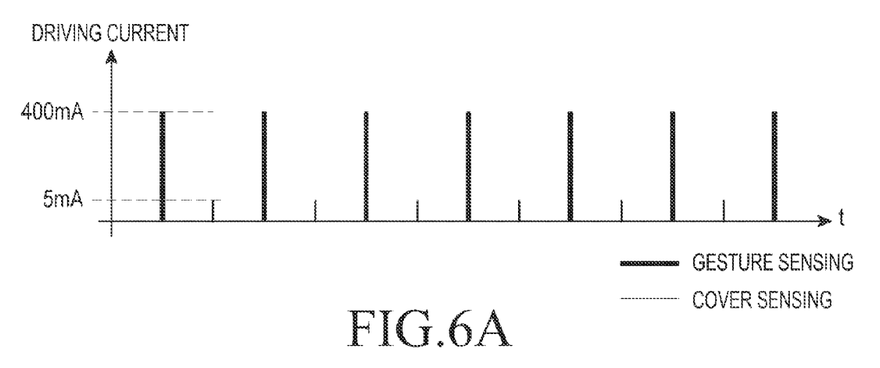
FIGS. 6A and 6B are waveform diagrams illustrating a state of a periodic change in a level of a driving current for a proximity sensor during operations of FIG. 4 or FIG. 5 according to an embodiment of the present disclosure.

When the display panel 140 is in an active state such as a multimedia playback operation and the like, the controller 10 performs a cover sensing mode when the protective cover 2 is closed, and alternately performs a gesture sensing mode and a cover sensing mode by periods when the protective cover 2 is open. In this example, when the display panel 140 is in an active state and the protective cover 2 is closed, the controller 10 performs a control to display an image on a portion corresponding to the transparent window 2d of FIG. 2A contained in the protective cover 2 in the display panel 140. As described above, when the display panel 140 is in an active state and the protective cover 2 is open, the controller 10 may alternately perform a gestures sensing mode and a cover sensing mode periodically so as to determine whether the protective cover 2 is open in addition to performing a gesture input sensing operation. When a state in which the cover is closed is sensed while the gesture input sensing operation and an operation of sensing whether the cover is open or closed are alternately performed, the controller 10 may change an operation mode into an operation mode corresponding to the state in which the cover is closed. When a period for alternately performing the gesture sensing mode and the cover sensing mode is set to be short, for example, within a range from a few ms to thousands ms, a user may not recognize a change between different modes and thus, the user may not feel inconvenienced when inputting a gesture. A driving current level associated with an operation period of the gesture sensing mode and the cover sensing mode will be described as illustrated in FIG. 6A.

Figure 6B:
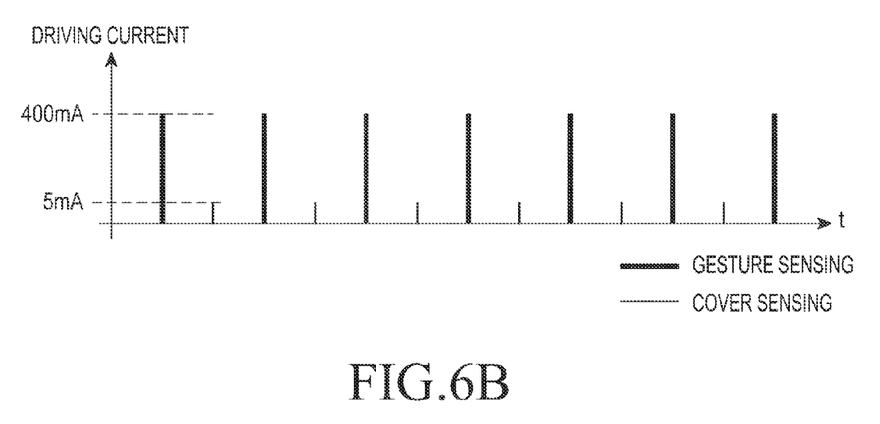

Subsequently, in a state in which the display panel 140 is in a sleep mode, the cover sensing mode is performed when the protective cover 2 is closed and the proximity sensing mode and the cover sensing mode are alternately performed periodically when the protective cover 2 is open. Alternately performing the proximity sensing mode and the cover sensing mode periodically in a state in which the display panel 140 is in a sleep mode and the cover is open may be for determining whether the cover is open or closed in addition to performing a proximity input sensing operation. When it is sensed that the cover is closed while the proximity input sensing operation and an operation for sensing whether the cover is open or closed are alternately performed, the controller 10 changes an operation mode into an operation mode corresponding to the state in which the cover is closed. Also, when the proximity input is sensed, the controller 10 may change the operation mode into an active state. A driving current level associated with an operation period of the proximity sensing mode and the cover sensing mode is as illustrated in FIG. 6B.

In addition, the controller 10 may perform only the proximity sensing mode when the portable electronic device 1 is in a call state.

As described above, according to an embodiment of the present disclosure, various sensing modes using a proximity sensor may be performed based on various states of a portable electronic device, for example, an active state, a sleep state, a call state, which will be described with reference to FIG. 4.

Figure 4:
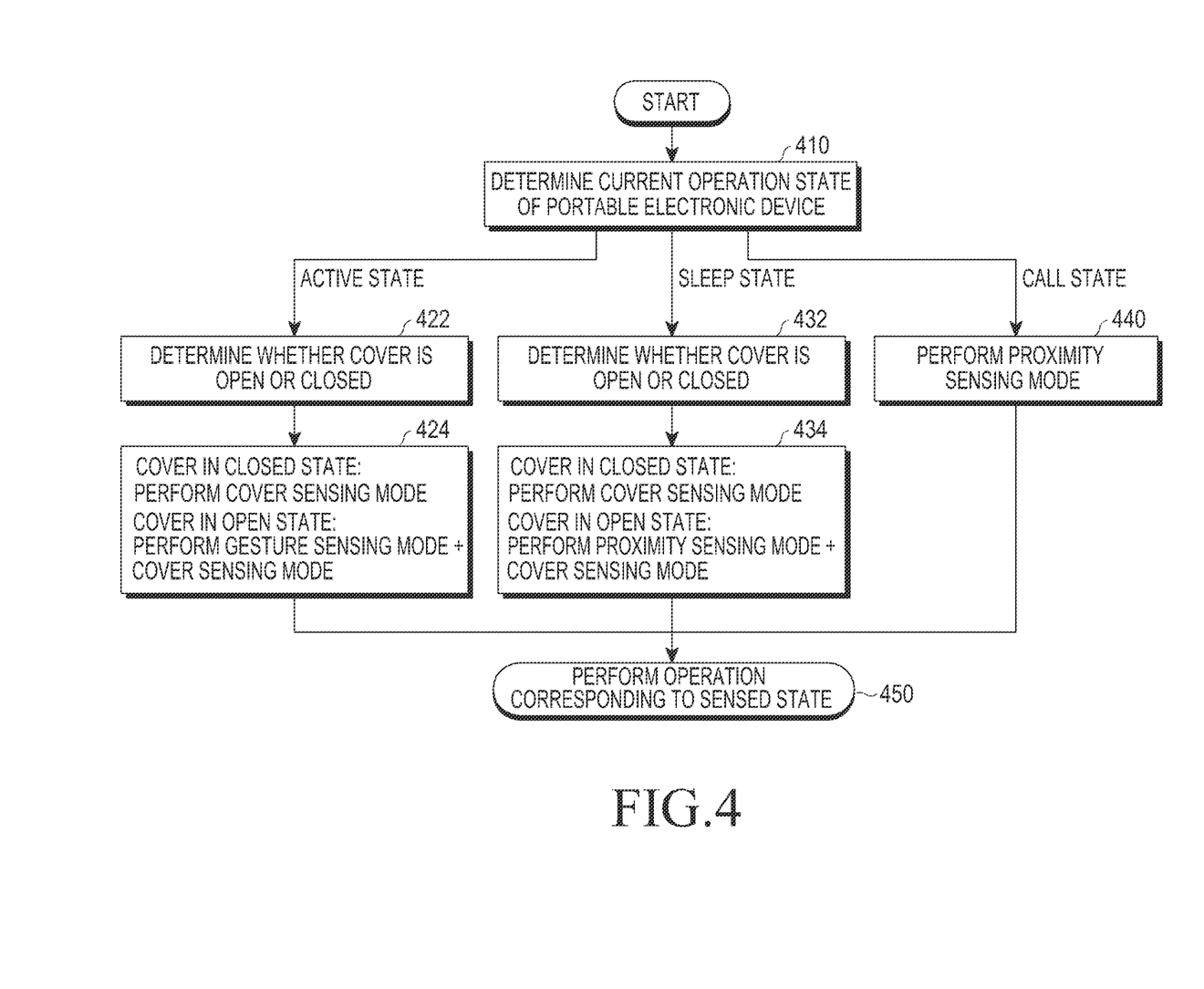
FIG. 4 is a flowchart illustrating an operation of controlling driving of a portable electronic device equipped with a flip protective cover according to an embodiment of the present disclosure.

FIG. 4 is a flowchart illustrating an operation of controlling driving of a portable electronic device equipped with a flip protective cover according to an embodiment of the present disclosure, which illustrates an operation of the controller 10 based on an operation state of the portable electronic device and a sensing mode of a proximity sensor.

As illustrated in FIG. 4, in operation 410, the controller 10 determines a current operation state of the portable electronic device 1, and proceeds with operation 422 when the operation state is in an active state, proceeds with operation 432 when the operation state is in a sleep state, and proceeds with operation 440 when the operation states is in a call state.

In operation 422, since the operation state of the portable electronic device is in an active state, the controller 10 determines whether the protective cover 2 is open or closed. Subsequently, in operation 424, when the protective cover 2 is currently in a closed state, the controller 10 performs a cover sensing mode. When the protective cover is currently in an open state, the controller 10 alternately performs a gesture sensing mode and a cover sensing mode periodically.

In operation 432, since the current operation state of the portable electronic device is in a sleep state, the controller 10 determines whether the protective cover is open or closed. Subsequently, in operation 434, when the protective cover 2 is currently in a closed state, the controller 10 performs a cover sensing mode. When the protective cover 2 is currently in an open state, the controller 10 alternately performs a proximity sensing mode and a cover sensing mode by periods.

In operation 440, since the current operation state of the portable electronic device is in a call state, the controller 10 performs a proximity sensing mode. After one of operation 422, operation 432, and operation 440, the controller 10 performs an operation corresponding to the sensed state.

Figure 5:
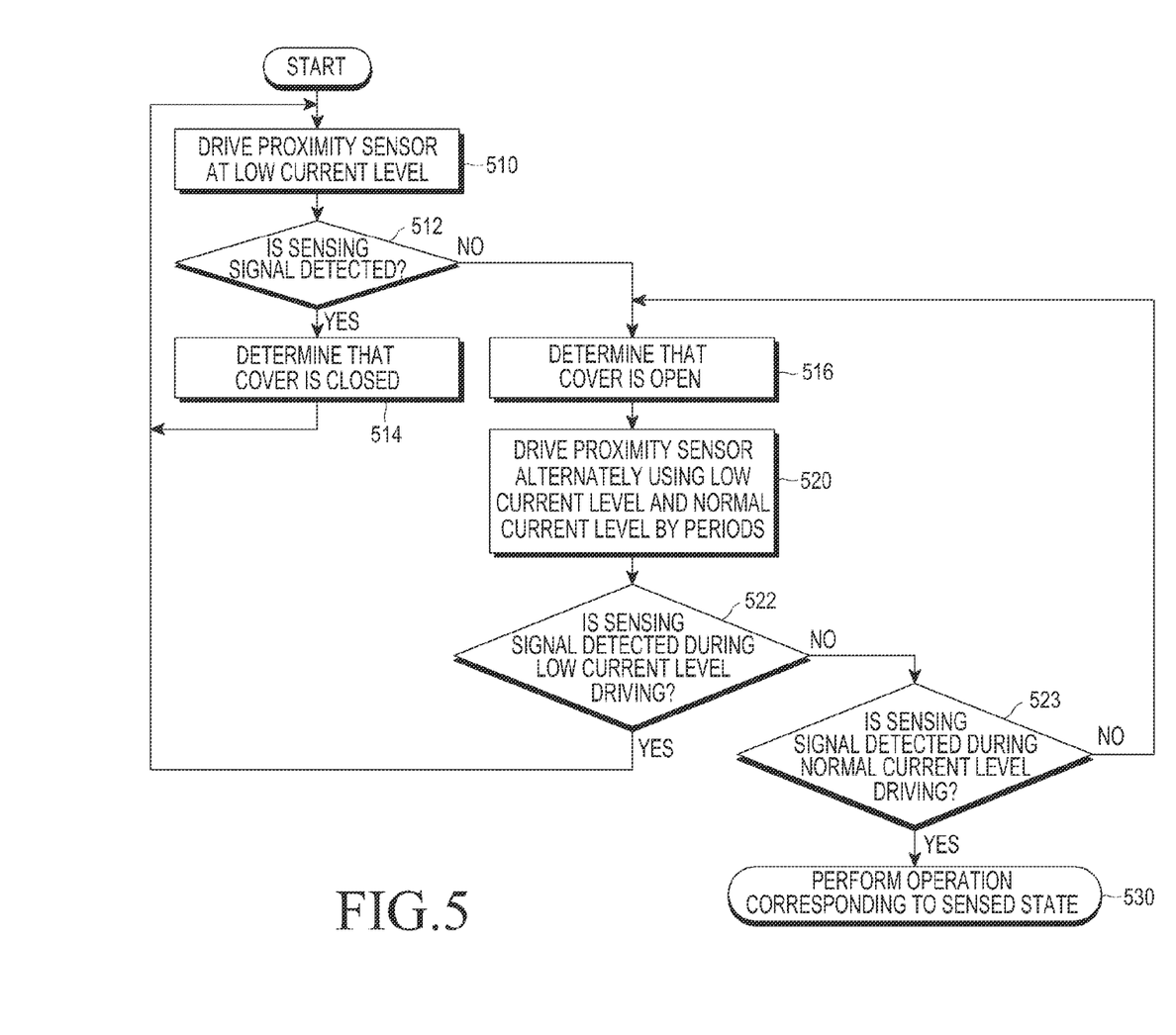
FIG. 5 is a flowchart illustrating an operation of controlling driving of a portable electronic device equipped with a flip protective cover according to another embodiment of the present disclosure.

FIG. 5 is a flowchart illustrating an operation of controlling a portable electronic device equipped with a protective cover according to another embodiment of the present disclosure, and illustrates a flow of the operation from a perspective of a current driving level. Referring to FIG. 5, in operation 510, a proximity sensor is driven at a low current level (e.g., a second driving current level). Subsequently, in operation 512, when a sensing signal is detected from the proximity sensor 15, the controller 10 proceeds with operation 514, determines that the cover is in a closed state using the sensing signal, and returns to operation 510.

In operation 512, when a sensing signal is not detected from the proximity sensor 15, the controller 10 proceeds with operation 516, determines that the cover is in an open state, and proceeds with operation 520. In operation 520, the controller 10 drives the proximity sensor 15 alternately using a low power level and a normal current level by periods. A driving current level period for driving the proximity sensor 15 as described above is as illustrated in FIGS. 6A and 6B.

Subsequently, in operation 522, the controller 10 determines whether a sensing signal is detected during a period for a low current level driving. When the sensing signal is detected, the controller 10 determines that the cover is in a closed state, and proceeds with operation 510. When the sensing signal is not detected during the period for the low current level driving in operation 522, the controller proceeds with operation 523.

In operation 523, the controller 10 determines whether a sensing signal is detected during a period for a normal current level driving in operation 520, and when the sensing signal is not detected, the controller proceeds with operation 516. When the sensing signal is detected, the controller 10 performs an operation corresponding to the sensed state in operation 530.

A protective cover of a portable electronic device according to an embodiment of the present disclosure and a configuration and a driving operation of the corresponding portable electronic device may be embodied as described above. Although the detailed embodiments of the present disclosure have been described, various modifications are possible, without departing from the scope of the disclosure. Therefore, the scope of the present disclosure is not limited by the various embodiments and shall be construed on the basis of the accompanying claims and the equivalent to the claims belongs to the present disclosure. Accordingly, the scope of the present disclosure shall not be determined by the above-described embodiments, and is to be determined by the following claims and their equivalents. For example, in another embodiment in addition to the configuration according to the embodiment, a temperature sensor for sensing a temperature may be included in an appropriate portion of a portable electronic device. Through determining whether a temperature associated with a proximity of a body part of a user is sensed by the temperature sensor based on a predetermined threshold, the proximity of the user may be determined without an error.

Also, in the descriptions, in a state in which the cover is closed as shown in FIG. 5, the proximity sensor 15 is driven at a low current level, and a driving period may be set to be identical to a driving period of a low current level as illustrated in FIGS. 6A and 6B, or may be set to be faster than that. Also, the design may be variously changed. For example, when the portable electronic device is in a sleep mode and the like, a driving period may be set to be slower.

Also, although it is described that the controller 10 performs different operations for a plurality of driving modes based on various operation states of the portable electronic device, a few of the plurality of driving modes may be performed in another embodiment of the present disclosure. Also, the controller 10 merely determines that the cover is in a closed state when a sensing signal is generated from a proximity sensor while the proximity sensor is periodically driven at a low power level.

Also, although the protective cover of the portable electronic device has been described by exemplifying a flip-type protective cover, various protective covers such as a pocket-type protective cover and the like may be applicable when a proximity sensor contained in the portable electronic device is capable of recognizing whether a corresponding protective cover is open or closed.

It will be appreciated that the various embodiments of the present disclosure may be implemented in a form of hardware, software, a combination of hardware and software. Any such software may be stored, for example, in a volatile or non-volatile storage device such as a Read Only Memory (ROM), a memory such as a Random Access Memory (RAM), a memory chip, a memory device, or a memory Integrated Circuit (IC), or a recordable optical or magnetic medium such as a Compact Disc (CD), a Digital Versatile Disc (DVD), a magnetic disk, or a magnetic tape, regardless of its ability to be erased or its ability to be re-recorded. It will be appreciated that a memory, which may be incorporated in a portable electronic device, may be an example of a machine-readable storage medium which is suitable for storing a program or programs including commands to implement the various embodiments of the present disclosure. Therefore, various embodiments of the present disclosure provide a program including codes for implementing a system or method claimed in any claim of the accompanying claims and a machine-readable device for storing such a program. Moreover, such a program as described above can be electronically transferred through an arbitrary medium such as a communication signal transferred through cable or wireless connection, and the present disclosure properly includes the things equivalent to that.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable electronic device equipped with a protective cover, the portable electronic device comprising:
    a protective cover that is equipped with a reflector having a light reflection characteristic;
    a proximity sensor that is equipped with a light emitting unit and a light receiving unit, and that is configured to generate a sensing signal based on an amount of light that the light receiving unit receives in response to light emitted from the light emitting unit; and
    a controller configured to:
        receive the sensing signal generated from the proximity sensor,
        determine whether the protective cover is open or closed,
        be driven in an operation mode of one selected from a first driving current level and a second driving current level that is lower than the first driving current level, and
        determine that the protective cover is closed when the sensing signal is output while the proximity sensor is driven at the second driving current level.

2. The portable electronic device of claim 1 wherein the light emitting unit of the proximity sensor is configured to operate in an operation mode of one selected from the first driving current level and the second driving current level.

3. The portable electronic device of claim 1, wherein the proximity sensor is installed in one side of the portable electronic device, and
    wherein the reflector is formed in a portion of the protective cover corresponding to a position where the proximity sensor is installed on the portable electronic device.

4. The portable electronic device of claim 1, wherein the reflector is formed in a face of one side of the protective cover to face the proximity sensor.

5. The portable electronic device of claim 1, wherein the second driving current level is:
   set to enable the amount of light that the light receiving unit absorbs after the emitted light is reflected by the reflector to be higher than a predetermined reference value to determine a proximity of an object; and
   set to enable the amount of light that the light receiving unit absorbs after being reflected by a body part of a user to be lower than the predetermined reference value set to determine the proximity of the object.

6. The portable electronic device of claim 5, wherein the second driving current level is set based on a value of 5 mA.

7. The portable electronic device of claim 1, wherein the proximity sensor is configured to be driven in an operation mode of one selected from the first driving current level and the second driving current level that is lower than the first driving current level, and
   wherein the first driving current level is configured to be set to enable the amount of light that the light receiving unit absorbs after being reflected by a body part of a user to be higher than a predetermined reference value to determine a proximity of an object.

8. A method of driving a portable electronic device equipped with a protective cover, the method comprising:
   driving, at a predetermined low current level, a proximity sensor that generates a sensing signal corresponding to a proximity of an object based on an amount of light that a light receiving unit absorbs after being generated from a light emitting unit and being reflected by an object;
   determining, by the portable electronic device, that the protective cover is closed when the sensing signal is output from the proximity sensor while the proximity sensor is driven at the low current level; and
   when the sensing signal is not output from the proximity sensor while the proximity sensor is driven at the low current level, determining that the protective cover is open,
   wherein, when the protective cover is open, the method further comprises:
      alternately performing, based on a predetermined period, an operation of driving the proximity sensor at the low current level and an operation of driving the proximity sensor based on a normal current level,
      determining that the protective cover is closed when the sensing signal is detected in a period in which the proximity sensor is driven at the low current level, and
      determining that a proximity of an object different from the cover is sensed when the sensing signal is detected in a period in which the proximity sensor is driven at the normal current level.

9. The method of claim 8, wherein the protective cover includes a reflector having a light reflection characteristic, the reflector being formed in a portion of the protective corresponding to a position where the proximity sensor is installed on the portable electronic device.

10. The method of claim 8, wherein the driving of the proximity sensor at the low current level is performed based on a predetermined period.

11. The method of claim 8, wherein, when it is determined that the proximity of the object different from the cover is sensed, the method comprises:
   performing an operation associated with a gesture sensing mode that senses a gesture or an operation associated with a proximity sensing mode that senses a proximity input of an object, based on an operation state of the portable electronic device.

12. The method of claim 9, wherein the low current level is:
   set to enable an amount of light that the light receiving unit absorbs after being generated from the light emitting unit of the proximity sensor and being reflected by the reflector to be higher than the predetermined reference value to determine a proximity of the object; and
   set to enable an amount of light that the light receiving unit absorbs after being generated from the light emitting unit of the proximity sensor and being reflected by a body part of a user to be lower than the predetermined reference value to determine the proximity of the object.

13. The method of claim 8, wherein the low current level is set based on a value of 5 mA.

* * * * *